US012792536B2

(12) United States Patent
Rumberg et al.

(10) Patent No.: US 12,792,536 B2
(45) Date of Patent: Nov. 10, 2026

(54) PROGRAMMABLE ANALOG PROCESSOR

(71) Applicant: ASPINITY, INC., Pittsburgh, PA (US)

(72) Inventors: Brandon David Rumberg, Pittsburgh, PA (US); Steven Andryzcik, Pittsburgh, PA (US)

(73) Assignee: ASPINITY, INC., Pittsburgh, PA (US)

( * ) Notice: Subject to any disclaimer, the term of this patent is extended or adjusted under 35 U.S.C. 154(b) by 0 days.

(21) Appl. No.: 19/258,126

(22) Filed: Jul. 2, 2025

(65) Prior Publication Data

US 2026/0010497 A1 Jan. 8, 2026

Related U.S. Application Data

(60) Provisional application No. 63/665,531, filed on Jul. 2, 2024.

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ..... G06F 3/0656; G06F 3/0688; G06N 3/063; G06N 3/049; G11C 7/1039; G11C 13/0002
See application file for complete search history.

(56) References Cited

U.S. PATENT DOCUMENTS

2006/0261846 A1* 11/2006 Twigg .................. H03K 19/173 326/37
2012/0317065 A1 12/2012 Bernstein
2016/0343452 A1* 11/2016 Ikeda ..................... G06N 3/065
2017/0255252 A1 9/2017 Kulathumani et al.
2018/0046900 A1* 2/2018 Dally ..................... G06N 3/048
2018/0269895 A1* 9/2018 Kim ...................... G04F 10/005
2019/0012287 A1* 1/2019 Snyder ................ G06F 9/44505
2019/0370084 A1* 12/2019 Behar .................... G06N 3/044
2020/0321963 A1 10/2020 Williams et al.
(Continued)

OTHER PUBLICATIONS

Martino Dazzi, Abu Sebastian, Luca Benini and Evangelos Eleftheriou, Accelerating Inference of Convolutional Neural Networks Using In-memory Computing, Frontiers in Computational Neuroscience, vol. 15, Article 674154, Aug. 2021 (Year: 2021).*
(Continued)

*Primary Examiner* — Aristocratis Fotakis
(74) *Attorney, Agent, or Firm* — Buckley, Maschoff & Talwalkar LLC

(57) ABSTRACT

An analog processor includes an array of Configurable Analog Blocks ("CABs") to receive analog signals as vector input data. Each CAB includes an analog delay element storing multiple time steps of the vector input data, and an analog convolution layer applies a set of analog weights to the vector input data to generate vector output data. Analog parameter storage and control circuitry configure operation of the CAB to apply a data processing network to the vector input data. A switch matrix interconnects CABs and transmits analog vector signals between CABs without conversion to digital signals. The analog processor applies the data processing network to the vector input data by propagating analog vectors through the array such that each CAB applies a portion of the data processing network.

15 Claims, 18 Drawing Sheets

(56) References Cited

U.S. PATENT DOCUMENTS

| | | | | |
|---|---|---|---|---|
| 2022/0028444 | A1* | 1/2022 | Papageorgiou | G06N 3/048 |
| 2022/0158651 | A1* | 5/2022 | Chao | G06F 3/0604 |
| 2022/0180158 | A1* | 6/2022 | Whatmough | G06N 3/065 |
| 2022/0223199 | A1* | 7/2022 | Gu | G11C 11/405 |
| 2023/0299885 | A1* | 9/2023 | Wang | G06N 3/048<br>370/328 |
| 2023/0344431 | A1* | 10/2023 | Savidis | H03K 19/1774 |
| 2024/0185130 | A1 | 6/2024 | Range et al. | |

OTHER PUBLICATIONS

Shafiee et al, ISAAC: A Convolutional Neural Network Accelerator with In-Situ Analog Arithmetic in Crossbars, 2016 ACM/IEEE 43rd Annual International Symposium on Computer Architecture (Year: 2016).*

Qinyu Chen, Yuxiang Fu, Wenqing Song, Kaifeng Cheng, Zhonghai Lu, Chuan Zhang and Li Li, An Efficient Streaming Accelerator for Low Bit-Width Convolutional Neural Networks, Electronics 2019, (Year: 2019).*

Byun et al, A Low-Power Analog Processor-in-Memory-Based Convolutional Neural Network for Biosensor Applications, Sensors 2022 (Year: 2022).*

Nagele et al, "Analog Multiply-Accumulate Cell With Multi-Bit Resolution for All-Analog AI Inference Accelerators", IEEE Transactions on Circuits and Systems-I: Regular Papers, vol. 70, No. 9, Sep. 2023 (Year: 2023).*

Xinyu Liu, Chao Li, Ziyun Jiang and Lu Han, Low-Complexity Pruned Convolutional Neural Network Based Nonlinear Equalizer in Coherent Optical Communication Systems, Electronics 2023 (Year: 2023).*

WP506 (v1.0.2), Xilinx AI Engines and Their Applications, White Paper: AI Engines, Oct. 3, 2018 (Year: 2018).*

Fan et al, Improving Utilization of Dataflow Unit for Multi-Batch Processing, ACM Transactions on Architecture and Code Optimization, vol. 21, No. 1, Article 17, Feb. 2024 (Year: 2024).*

Yunju Choi, Yoontaek Lee, Seung-Heon Baek, Sung-Joon Lee and Jaeha Kim, A field-programmable mixed-signal IC with time-domain configurable analog blocks, IEEE, Jun. 15-17, 2016 (Year: 2016).*

"PCT Notification of Transmittal of the International Search Report and the Written Opinion", Sep. 22, 2025 (Sep. 22, 2025), International Searching Authority, for International Application No. PCT/US2025/036245, 18pgs.

* cited by examiner

PROGRAMMABLE ANALOG PROCESSOR

CROSS-REFERENCE TO RELATED APPLICATIONS

The present application claims the benefit of U.S. Provisional Patent Application No. 63/665,531 entitled "PROGRAMMABLE ANALOG PROCESSOR" and filed Jul. 2, 2024. The entire content of that application is incorporated herein by reference.

BACKGROUND

Traditional sensor processing by a digital compute architecture utilizes a substantial amount of power. For example, converting all analog sensor data into the digital domain to perform signal processing and detect events is a high-power approach. In some cases, ultra-low power event detection and classification using sensor fusion leveraged by an analog machine learning core may be a preferable approach when power-consumption is a factor (e.g., advanced Artificial Intelligence ("AI") and/or Machine Learning ("ML")). Analog processing may deliver precise event classification for a wide range of detections while consuming near zero always-on power.

FIG. 1 is a system 100 using digital acceleration to run an ML model or more generally a network of data processing operations. The system 100 includes a global cache 110 and a two-dimensional array of simple processor tiles 120. Each tile 120 may include, for example, a small local cache 130 for layer weights, a simple Arithmetic Logic Unit ("ALU") 140 to perform arithmetic and/or logical operations on data, such as a multiply, an add, a Rectified Linear Unit ("ReLU") activation function for use in neural networks, etc., and an accumulator 150. Each tile 120 may perform scalar operations sequentially. Note that the whole two-dimensional array might run only one layer (or less) of a model at a time and therefore the results and model parameters must be shuffled between the array of processor tiles and the 110 global cache as the model is run on one decomposed piece of the network at a time.

FIG. 2 is a system 200 for reconfigurable analog processing utilizing a two-dimensional array of simple analog processor tiles 210 with switches 220 to perform scalar analog operations, such as filter, integrate, Multiply-Accumulate Operation ("MAC"), etc. The system 200 may utilize distributed parameter and/or program memory throughout the array and contain limited data memory throughout array to hold the state of the network that is being run.

It would be desirable to provide an improved programmable analog processor that operates as an AI accelerator in an accurate, automatic, and efficient manner.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

Figure 1:
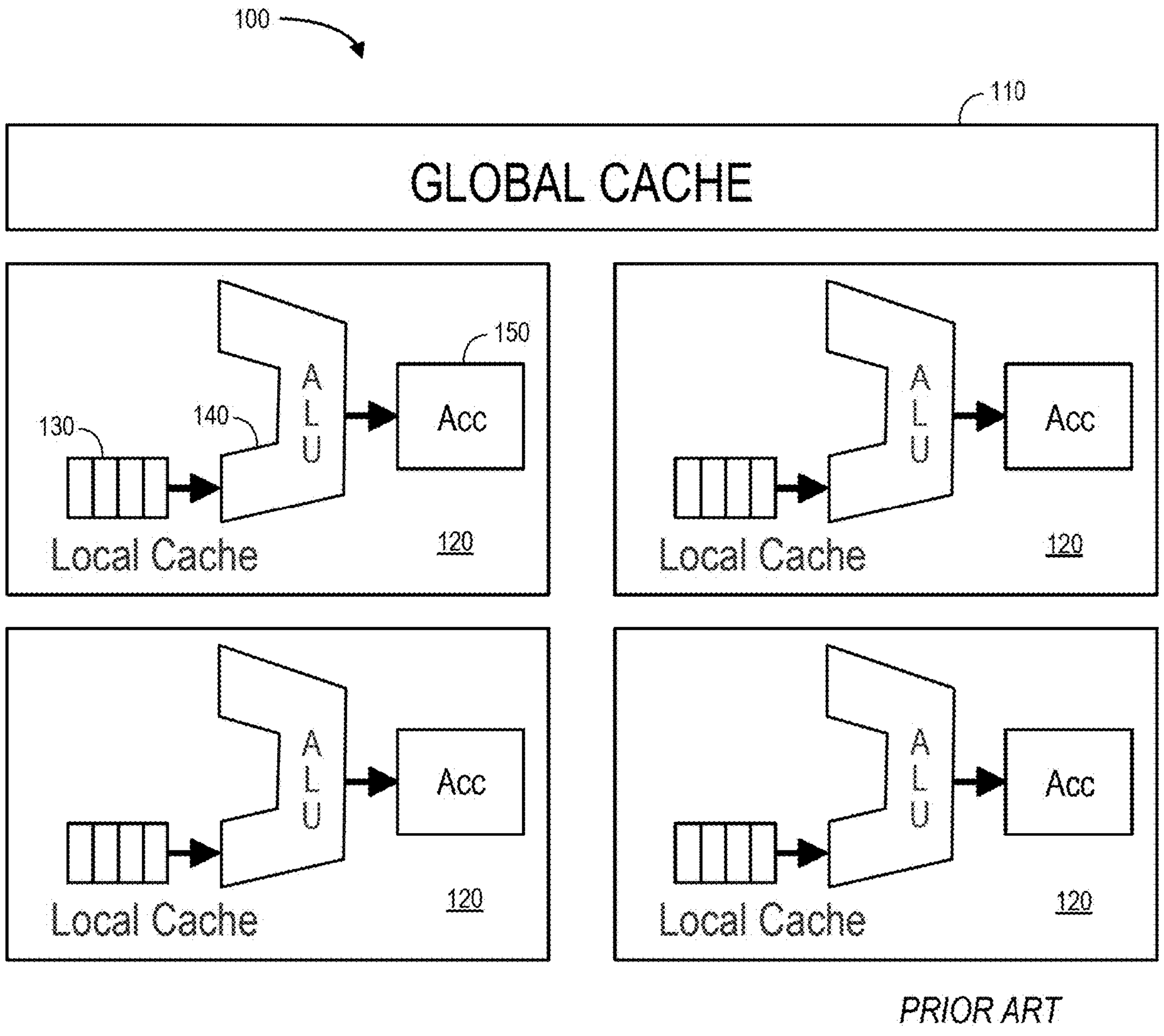
FIG. 1 is a system using digital acceleration.
Figure 2:
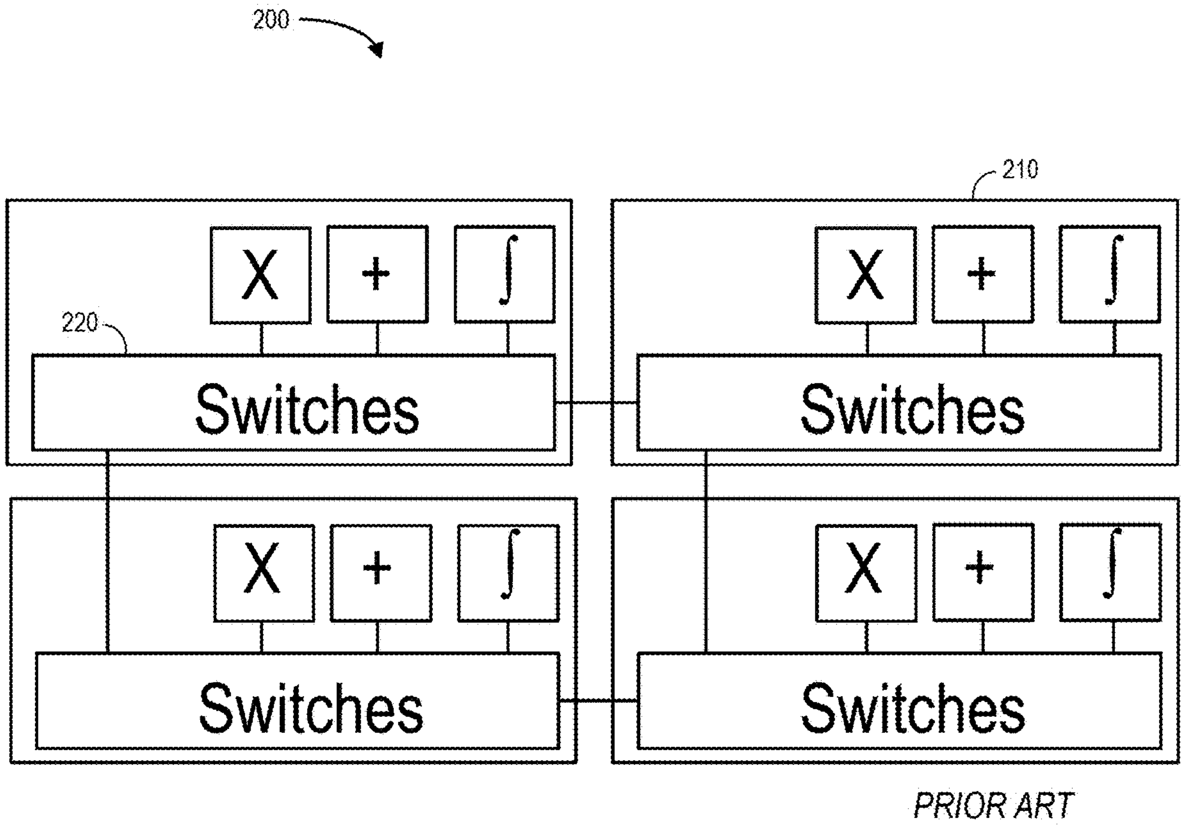
FIG. 2 is a system using reconfigurable analog processing.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 3:
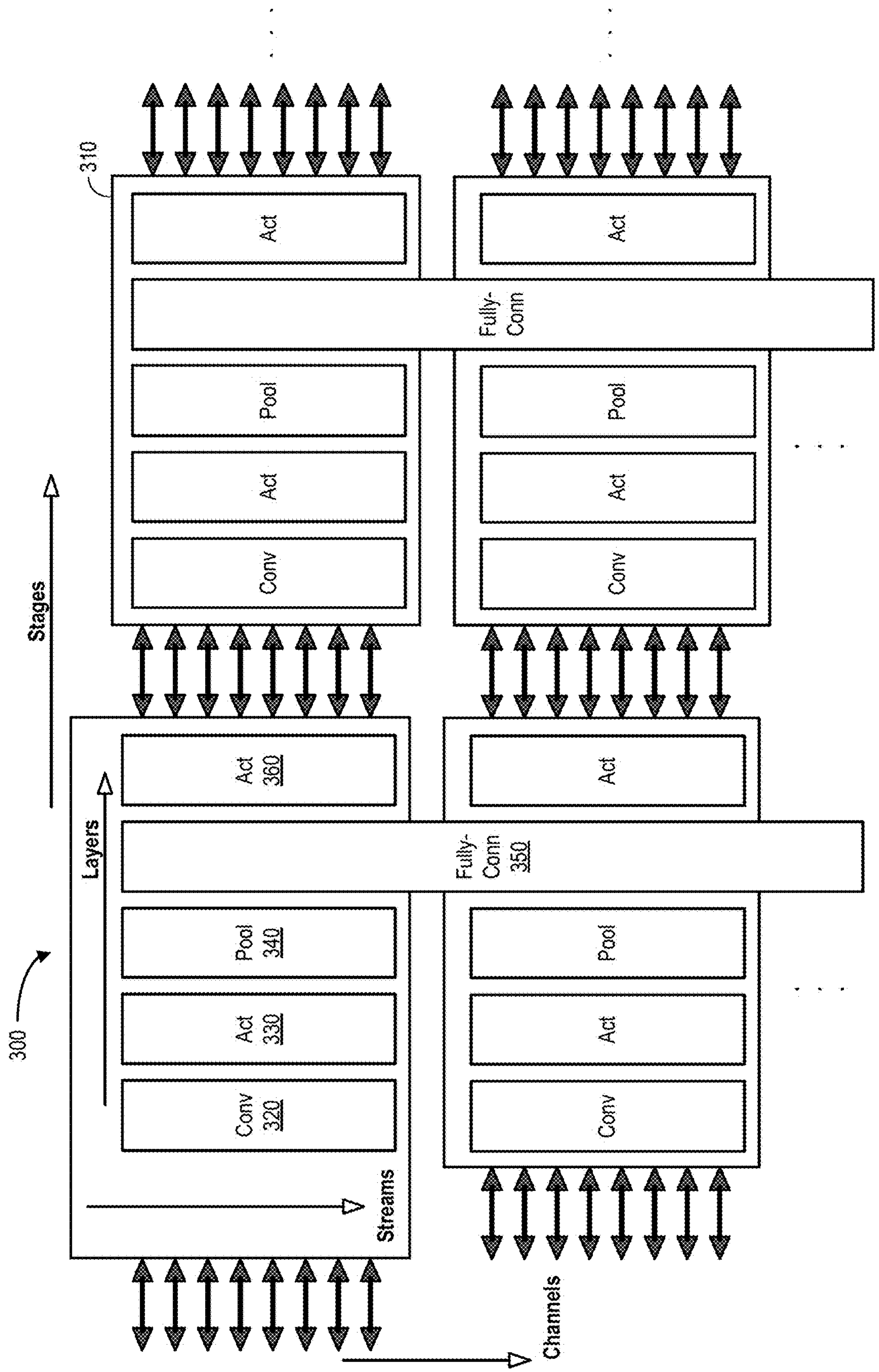
FIG. 3 is a system using a vector analog processor according to some embodiments.

FIG. 3 is system 300 using a vector analog processor according to some embodiments. A two-dimensional array of tiles (CABs) 310 contain programmable/reorderable vector operations. Each CAB 310 may contain a convolution element 320, an activation element 330, a pooling element 340, a fully-connected element 350, and another activation element 360. The fully-connected element 350 may provide communication across all tiles within a layer via weights (rather than routing). According to some embodiments, the system uses distributed data memory to improve performance.

Figure 4A:
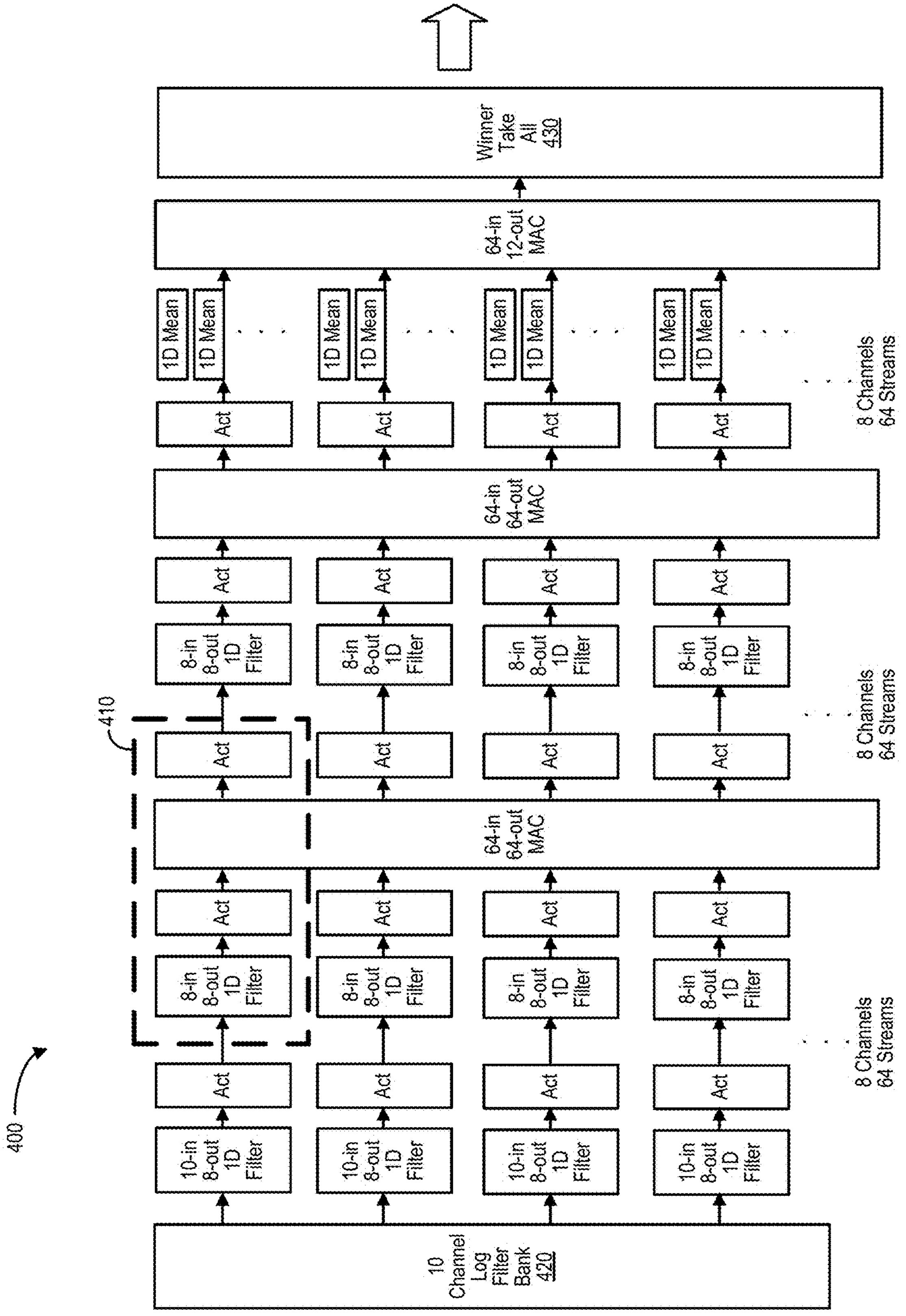
FIG. 4A is an example network configuration running in a vector analog processor in accordance with some embodiments.
Figure 4B:
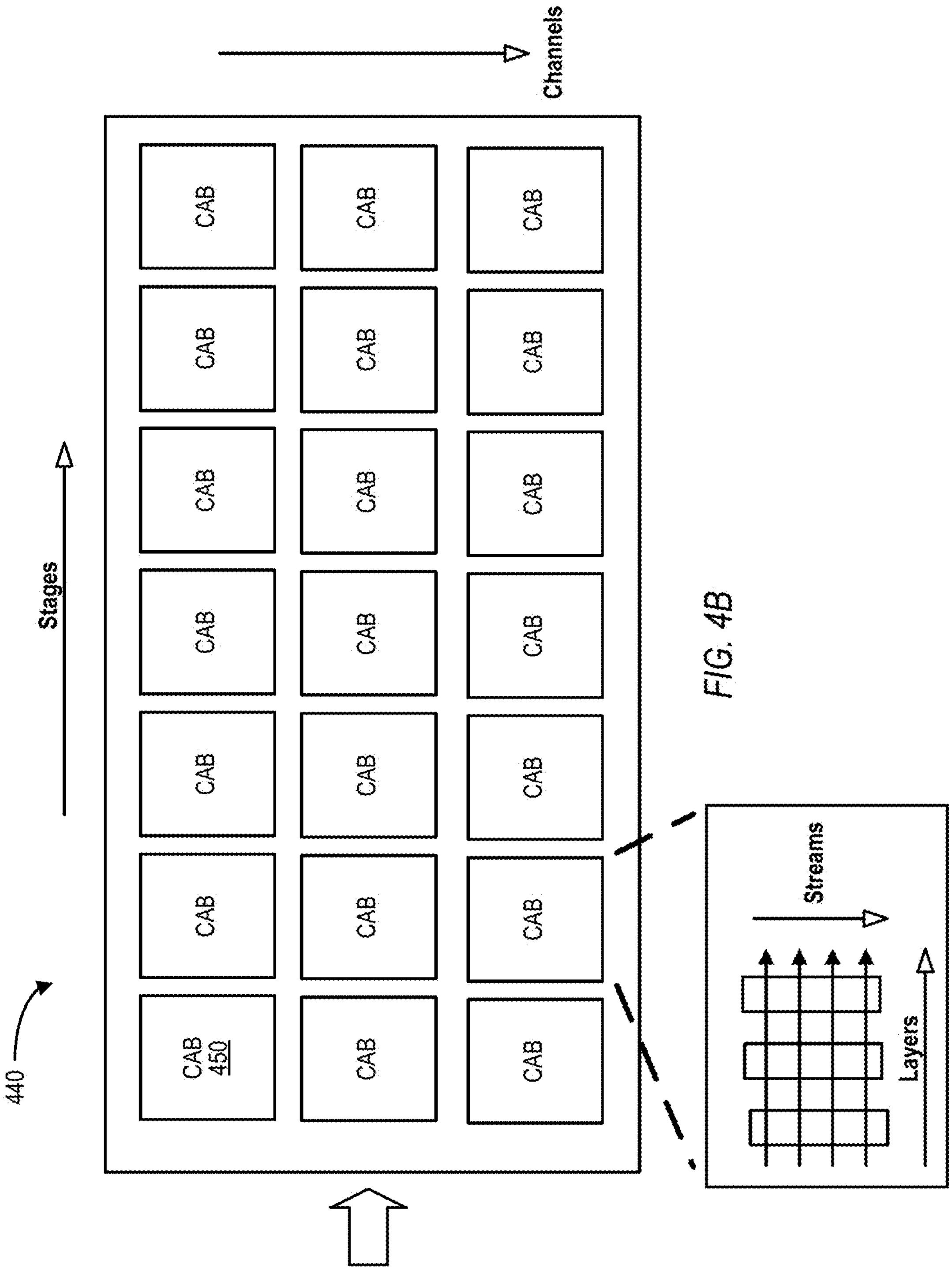
FIG. 4B is an accelerator architecture according to some embodiments.

FIG. 4A is an example network configuration running in a vector analog processor 400 in accordance with some embodiments. The system 400 may use fixed computation blocks and predefined interconnects. Moreover, the system may be optimized for specific model types. For example, the system 400 shown in FIG. 4A uses CAB blocks 410 that each contain an 8-in, 8-out, one-dimensional filter, an activation element, a 64-in, 64-out MAC, and another activation element. In some embodiments, a 19-channel logarithmic filter bank 420 converts an input stimulus to features that are provided to the first stage of CAB blocks 410 via a 10-in, 8-out one-dimensional filter. The output of the final stage of CAB blocks is averaged by one-dimensional means and provided to a 64-in, 12-out MAC. The output of the 64-in, 12-out MAC is then processed by a winner take all element 430. FIG. 4B is a next generation accelerator architecture 440 with two-dimensional Neural Network ("NN")/ML blocks 450 according to some embodiments. The NN/ML blocks 450 may have configurable block boundaries and contents. Moreover, a flexible interface and communication between the NN/ML blocks 450 may be optimized for a broad range of models, and in some embodiments a generic Open Neural Network Exchange ("ONNX") may be compiled to the array.

Figure 5:
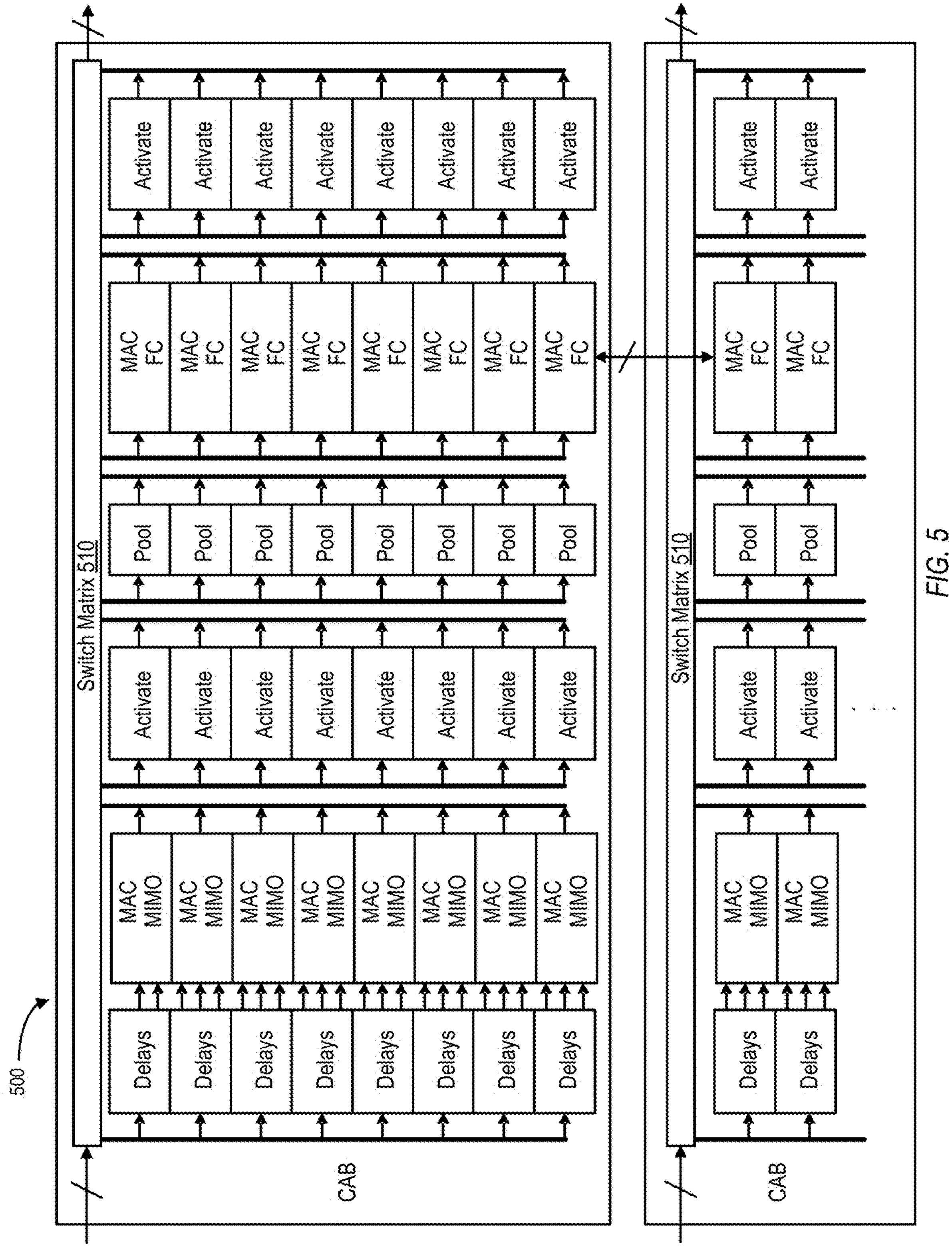
FIG. 5 is a more detailed example of vector analog tiles or Configurable Analog Blocks ("CABs") in accordance with some embodiments.

FIG. 5 is a more detailed system 500 with tiles and CABs in accordance with some embodiments. Here, a switch matrix 510 may communicate with vector processing operations such as delay elements, MAC Multi-Input, Multi-Output ("MIMO") elements, activation elements, pooling elements, MAC for Full Connection ("FC") elements, etc. The system 500 may utilize operations associated with digitally-controlled analog. The delay elements may provide delays via multiple outputs at different timesteps for a convolution kernel. Moreover, the delay elements may be associated with continuous or discrete time delays. The tile-level MAC MIMO elements may combine with delay elements to perform convolution or MIMO filtering by mixing all streams within the CAB. The activation elements may perform nonlinear functions (e.g., ReLU, sigmoid, Tanh, logarithm, etc.), and the pooling elements may be associated with continuous-time or discrete-time, maximum, average, etc. The layer-level MAC FC elements may mix signals in a layer together (e.g., how streams across all tiles in the same layer communicate with each other). The switch matrix 510 may perform signal routing to set an order of operations, feedback loops, etc.

Each CAB may, in some embodiments, consume an 8-element vector and generate an 8-element vector. Internally, a switch matrix 510 links analog compute operations such that common signal processing and ML functions may be synthesized. The primary analog compute operations include a delays layer followed by a MAC MIMO layer, which can be combined to perform grouped one-dimensional convolution, nonlinear activation layers, pooling layers, and a MAC FC layer that spans across CABs in a stage. The CAB configuration may be controlled by analog parameter memory and registers distributed throughout the CAB.

According to some embodiments, ML associated with opinionated neural network architectures are constructed from the CAB operations (e.g., Conv1d to ReLU to MaxPool1d to Linear to Sigmoid), and such networks can be expressed on the system 500 to cover many applications. Note, however, that the programmability of the system 500 architecture can support a wide array of computations including recurrent layers (GRUs & LSTMs), filter synthesis, adaptive filtering, beamforming, Ordinary differential equation examples ("ODE") solving, as well as other applications that need to accelerate matrix and nonlinear functions on time-series data.

Figure 6:
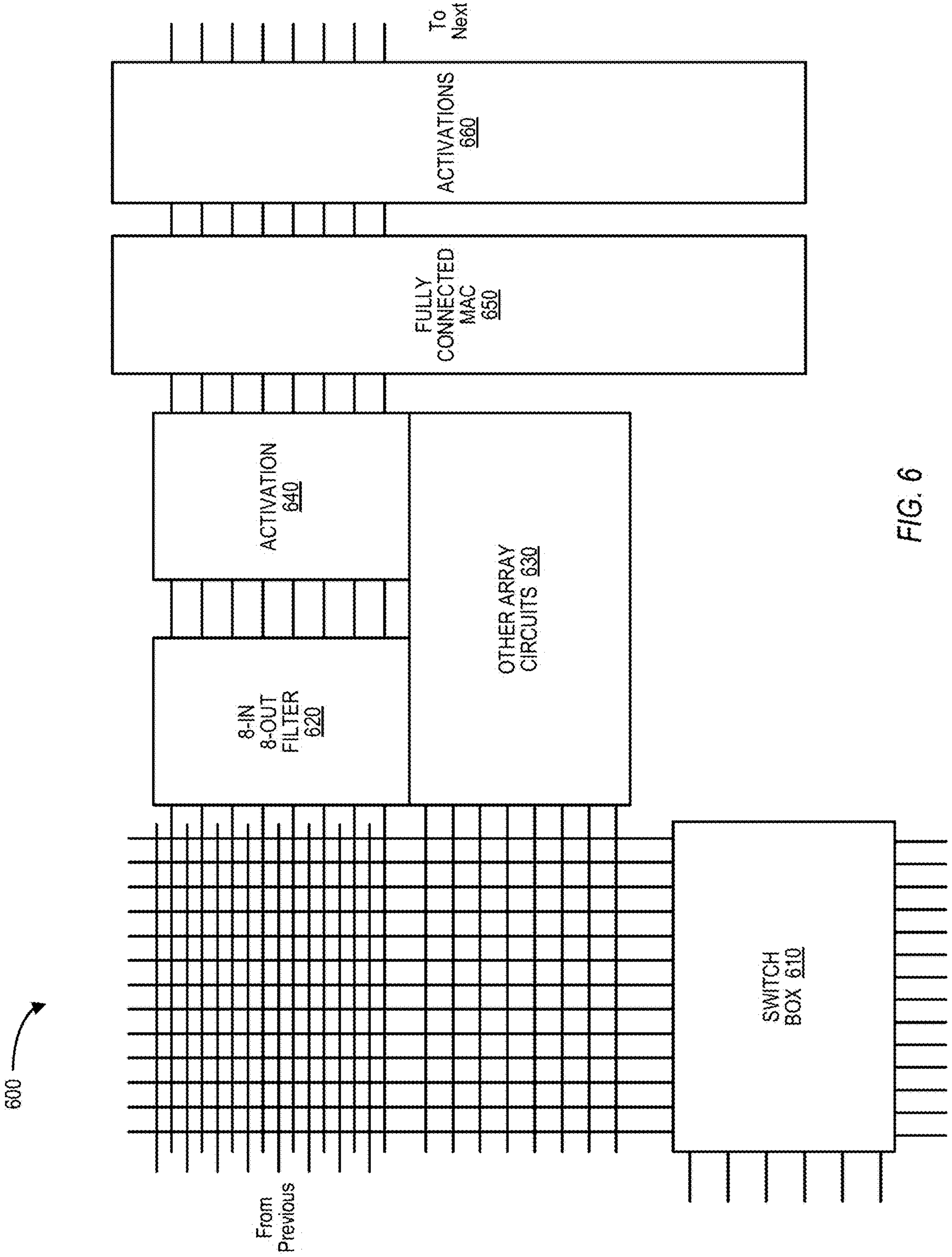
FIG. 6 is a CAB according to some embodiments.

FIG. 6 is a CAB 600 (core tiled compute block) according to some embodiments. The CAB 600 includes a switch box 610 for low-level reconfiguration, an 8-in, 8-out filter 620, an activation element 640, other array circuits 630 (e.g., logarithm, mirror, etc.), a fully connected MAC 650, and another activation element 660. With respect to communication across CABs 600, stage-to-stage each CAB 600 may be fed by 8 signals from an upstream CAB 600, and channel-to-channel a fully-connected 64-in/64-out MAC 650 may allow for an arbitrary mixing of signals across all channels. Control registers and analog parameters may be distributed inside of CABs 600 at point-of-use to provide control. Such a CAB 600 may be associated with higher-level vector operations (8-in/8-out), and communication across channels via the MAC 650 may facilitate programming that is differentiable (and therefore trainable with ML tools). Some embodiments alternate local 8-channel mixtures with full 64-channel mixtures mirroring common "separable convolutions." Any remaining NN stages might then be processed digitally (e.g., because of lengthy time windows). According to some embodiments, analog memory, parameter memory, and signal state memory may be distributed at point of use.

Figure 7:
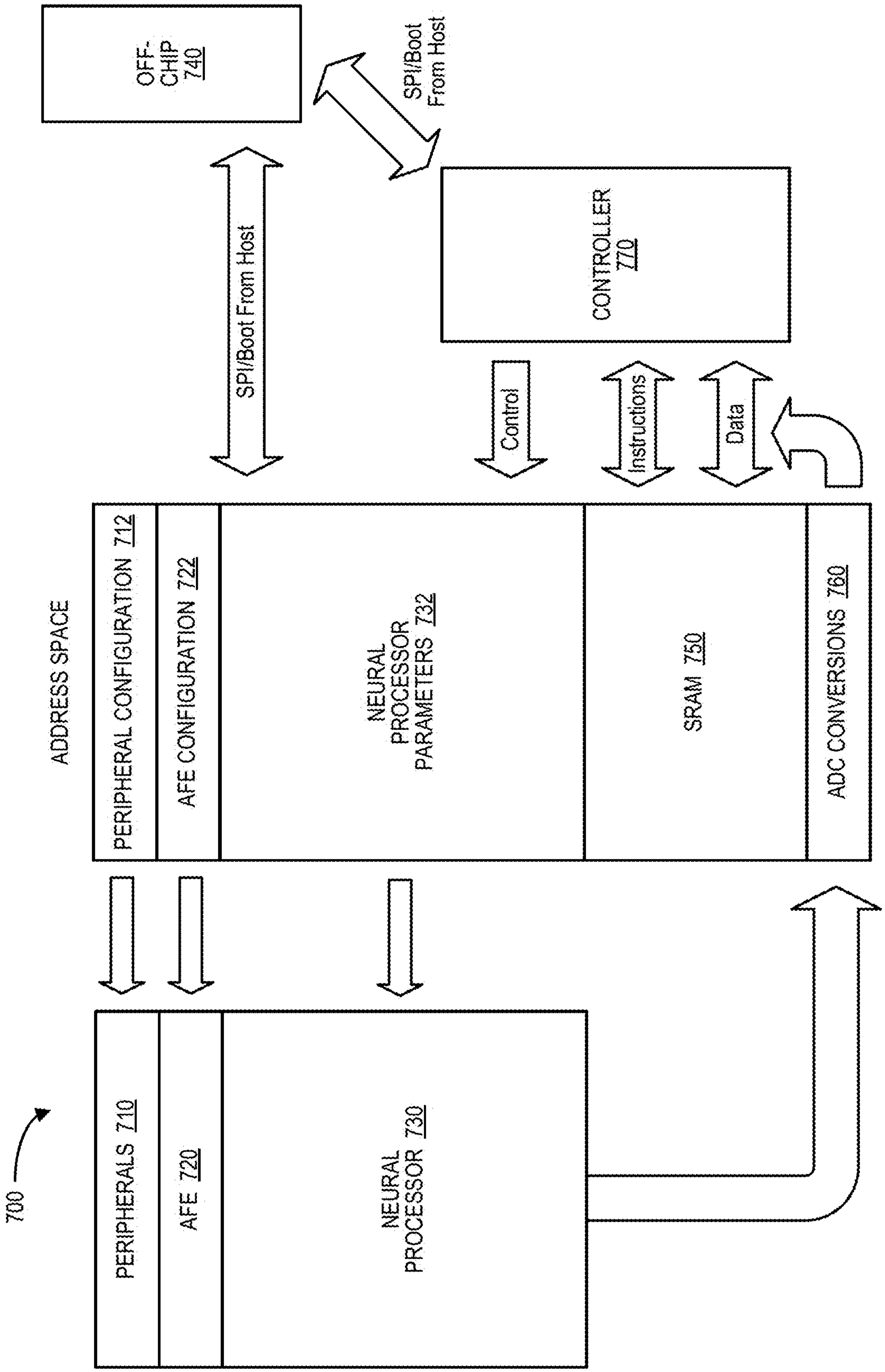
FIG. 7 is a control system in accordance with some embodiments.

FIG. 7 is a control system 700 in accordance with some embodiments. The system 700 includes peripherals 710 (in accordance with a peripheral configuration 712 in an address space) that communicate with a neural processor 730 (in accordance with neural processor parameters 732 in the address space) via an Analog Front End ("AFE") 720 (in accordance with a peripheral configuration 722 in the address space). The address space further includes a Static Random-Access Memory ("SRAM") 750 and Analog-to-Digital ("ADC") conversions 760. The address space may exchange information off-chip 740 via a Serial Peripheral Interface ("SPI") and/or boot from a host. The address space may receive control information from, and exchange instructions and data with, a controller 770.

Figure 8:
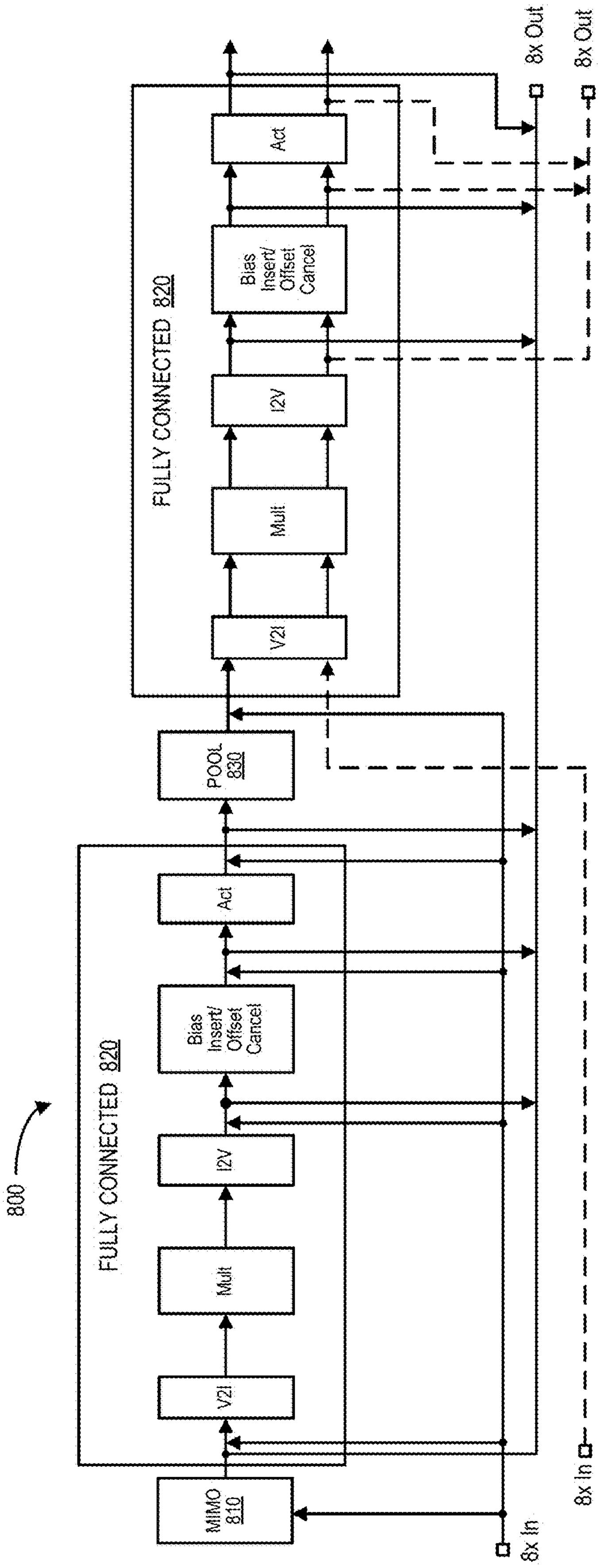
FIG. 8 is a signal chain according to some embodiments.

FIG. 8 is a signal chain 800 according to some embodiments. Each processing stream might be, for example, connected to an n-wide (e.g., 8-wide) bus. In some embodiments, each processing stream is associated with a MIMO 810 and provides signals to a fully connected system 820 with a Voltage-to-Current ("V2I") element coupled to a multiply element that, in turn, is coupled to a Current-to-Voltage ("I2V") element. The I2V element may be coupled to a bias insert/offset cancel element coupled to the I2V element which, in turn, is coupled to an activation element coupled to the bias insert/offset cancel element. In some embodiments, connections between different streams in the bus may be included. For instance, the output of the multiply elements may connect to multiply elements in other streams for an "accumulation." A pooling element 830 may pass information between fully connected systems 820 before being provided as an n-wide (e.g., 8-wide) output. In some embodiments, observation and insertion points are provided in the signal chain 800 for testing and debugging purposes. Moreover, the signal chain 800 may incorporate operating modes at each block, parameters and their ranges, tests for each block, and variation compensation details (e.g., changes as other parameters change). In some embodiments, the signal chain 800 may be associated with sources of error and specifications or corrections, and (in a Discrete Time ("DT") case) the MIMO 810 and pooling element 830 may hold state while everything else shuts down. In addition, when cycling parameters multiple weights may be applied per MIMO 810 frame, and specification requirements may be associated with bandwidth, noise, Dynamic Range ("DR"), startup time, leakage, energy, trim time, etc.

Figure 9:
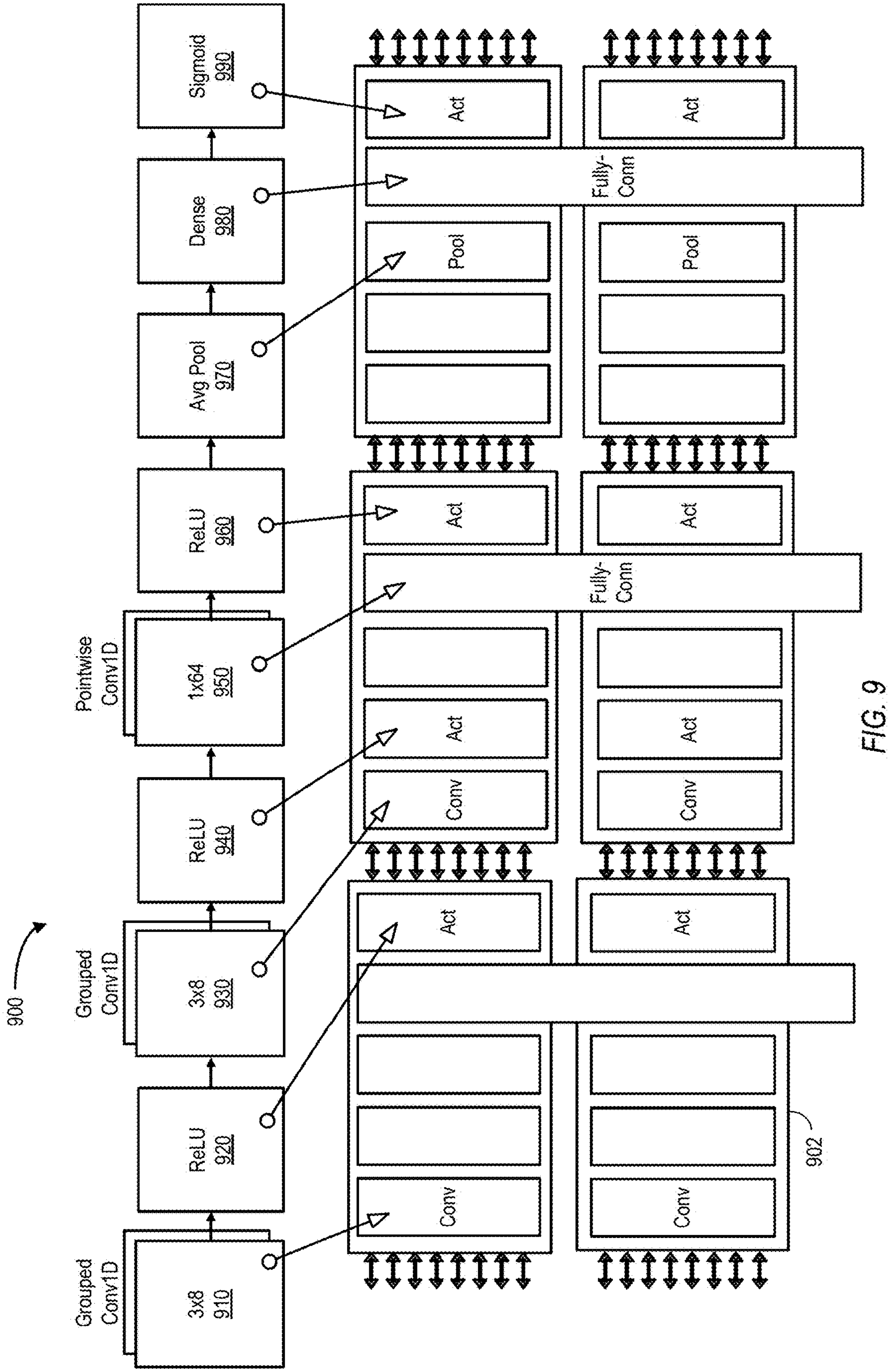
FIG. 9 is an illustration of a Convolutional Neural Network ("CNN") model mapped into CABs in accordance with some embodiments.

FIG. 9 is an illustration 900 of models mapped into CABs 902 to form a Convolutional Neural Network ("CNN") in accordance with some embodiments. A first 3×8 grouped one-dimensional convolution 910 is mapped to a convolution element in a first CAB 902, and a first ReLU 920 is mapped to an activation element in the first CAB 902. A second 3×8 grouped one-dimensional convolution 930 is mapped to a convolution element in a second CAB 902, a second ReLU 940 is mapped to an activation element in the second CAB 902, a 1×64 pointwise one dimensional convolution 950 is mapped to a fully-connected element in the second CAB 902, and a third ReLU 960 is mapped to another activation element in the second CAB 902. Finally, an average pool 970 is mapped to a pooling element in a third CAB 902, a dense step 980 is mapped to a fully-connected element in the second CAB 902, and a sigmoid function 990 (e.g., a mathematical function with an "S"-shaped curve) is mapped to an activation element in the third CAB 902.

Figure 10A:
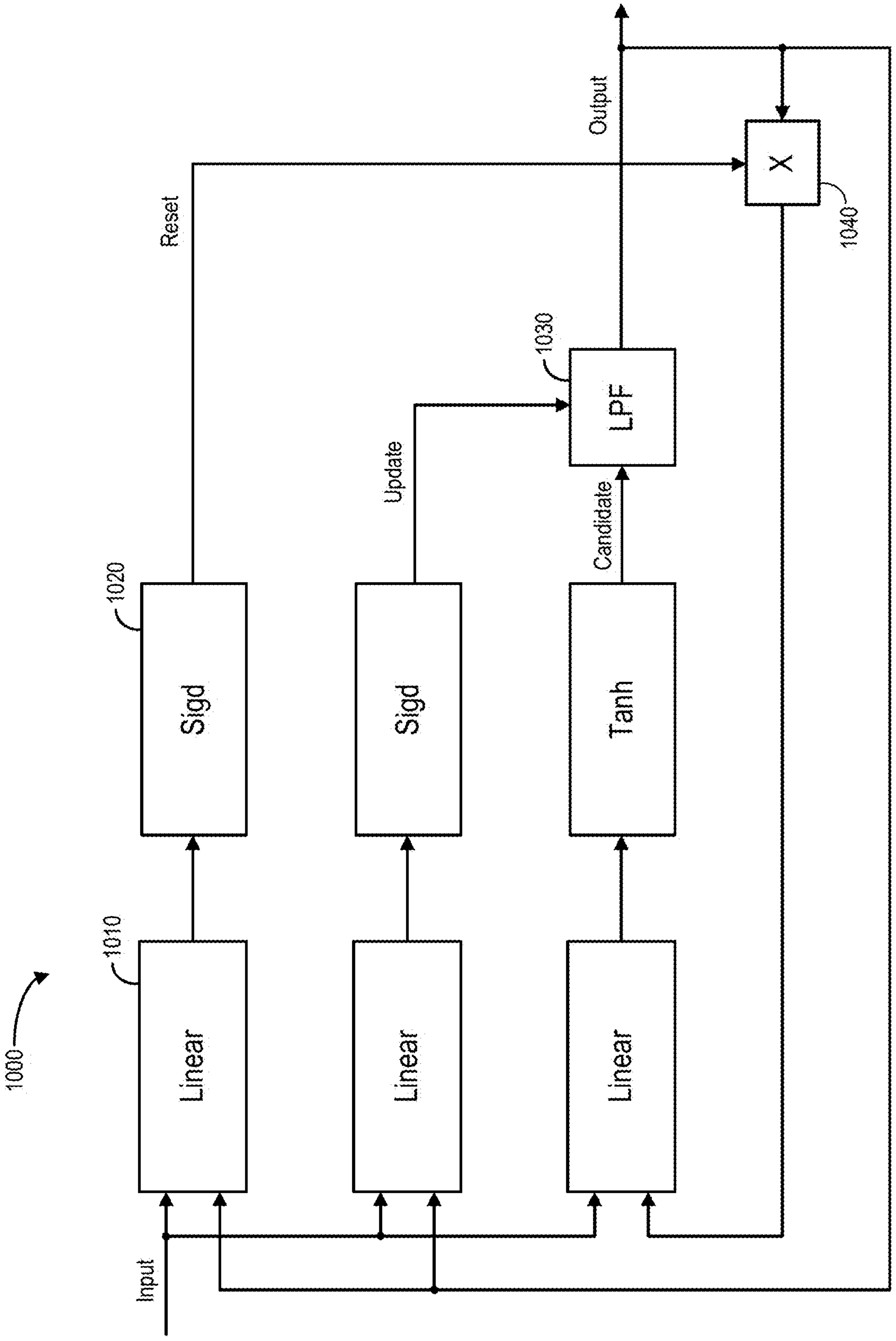
FIG. 10A is Gated Recurrent Unit ("GRU") according to some embodiments.

FIG. 10A is Gated Recurrent Unit ("GRU") 1000 according to some embodiments. An input is provided to three linear functions 1010 coupled to sigmoid functions 1020. The output of the first sigmoid function 1020 is provided to a multiplier 1040 as a "reset signal." The outputs of the second and third sigmoid functions 1020 are provided to a Low Pass Filter ("LPF") 1030 as an "update" signal that controls the corner frequency at which the "candidate" signal is filtered. The output of the LPF 1030 is also provided to the multiplier 1040 and fed back to the first linear function 1010 and the second linear function 1010. The output of the multiplier is fed back to the third linear function 1010. Although a GRU 1000 is shown in FIG. 10A for simplicity, note that the circuit could be a Long Short-Term Memory ("LSTM") circuit instead.

Figure 10B:
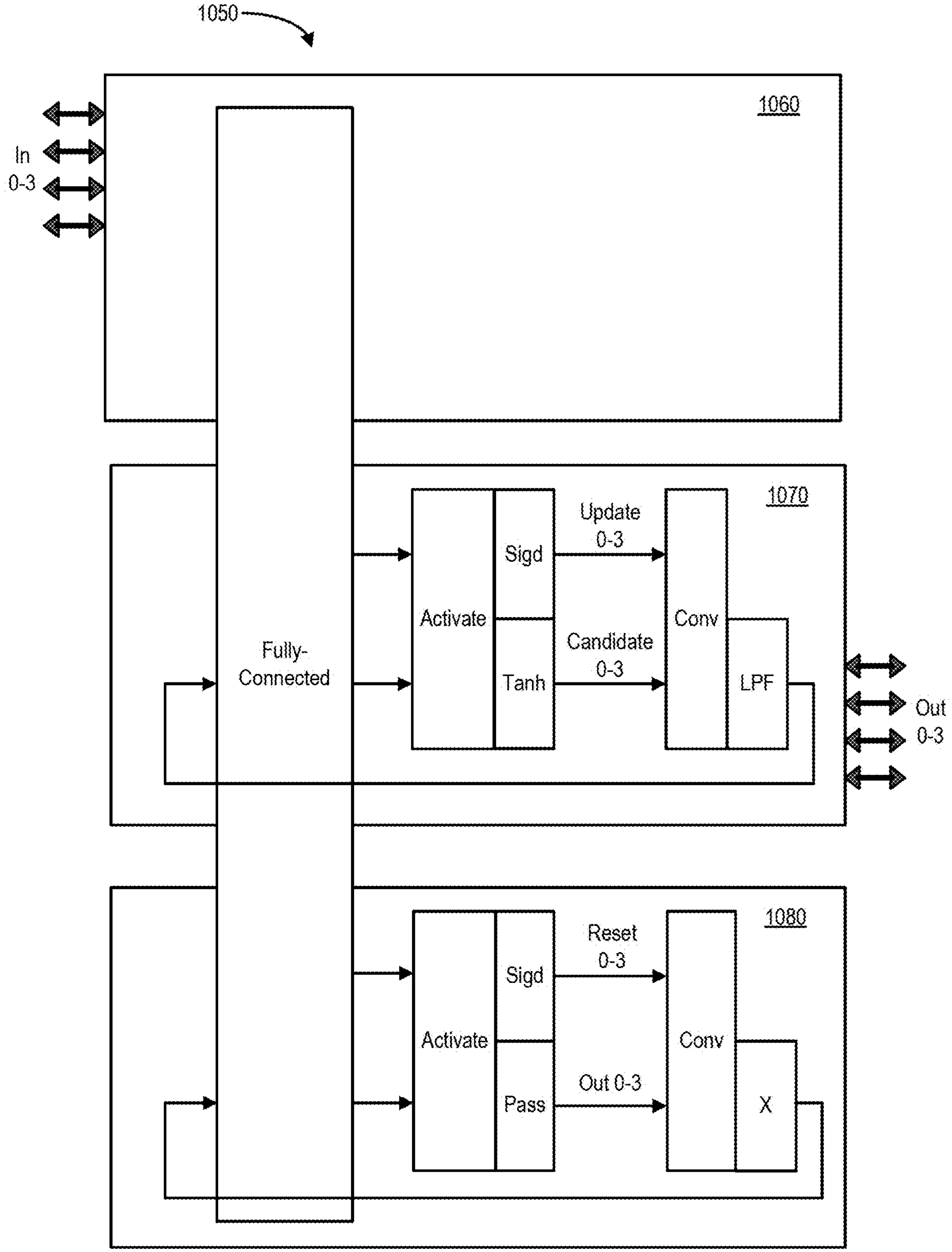
FIG. 10B is an illustration of a GRU model mapped into CABs according to some embodiments.

FIG. 10B is an illustration 1050 of models mapped into three fully-connected CABs 1060, 1070, 1080 to form a GRU according to some embodiments (that is, the linear layers are all merged in the fully-connected operation). For simplicity, the example shown in FIG. 10B is for a 4-element wide GRU cell. The relevant activations (sigmoid function and hyperbolic tangent function) are selected for each fully-connected output, and a 4-element input vector enters the layer via the first CAB 1060. The second CAB 1070 uses an activation element, a sigmoid function, and a tanh function to generate update and candidate vectors for a convolution element and LPF function (performed with filters from a convolution operation). The third CAB 1080 uses an activation element, a sigmoid function, and a passthrough function to generate reset and output vectors for a convolution element and multiplier function. The final 4-element output vector leaves the layer via the second CAB 1070. The element-wise multiplication in the third CAB 1080 is performed with the multipliers in the MAC MIMO portion of a convolution operation, and feedback wraps around via switch matrix in each CAB 1060, 1070, 1080.

Figure 11:
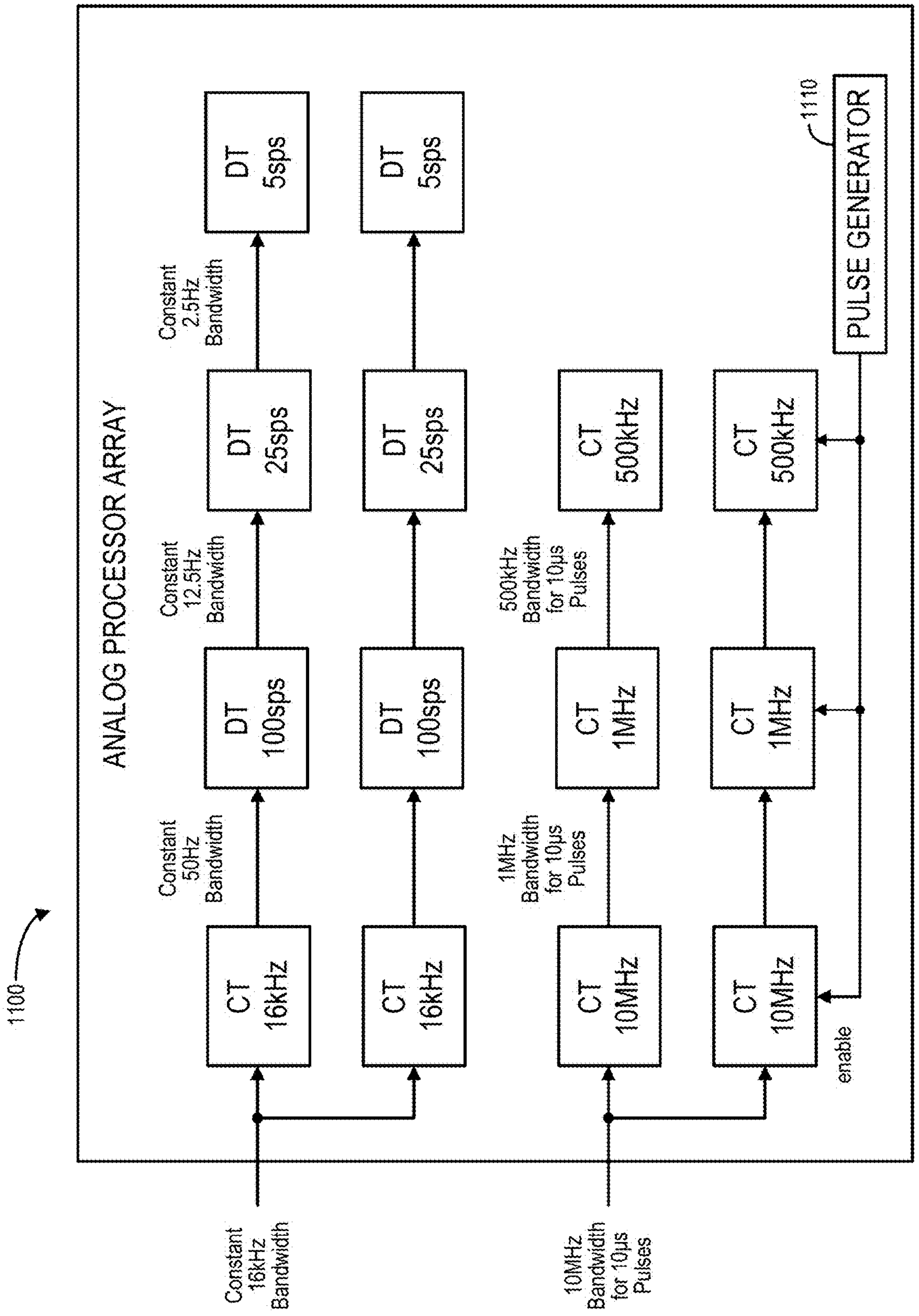
FIG. 11 is an illustration of models with mixed data rates mapped into CABs using tile-level biasing and gating in accordance with some embodiments.

FIG. 11 is a tile-level biasing and gating analog processor array 1100 for mixed data rates in accordance with some embodiments. The biasing range (frequency/power tradeoff) and DT clock frequency/gating are individually controlled per tile in the array 1100. This lets the array 1100 more efficiently handle a mixture of data rates simultaneously. For example, a processor may consume two sensor channels: (1) a 16 kHz bandwidth w/constant signal presence, and (2) a 10 MHz bandwidth present for 10 us every 1 ms. The mode of operation for each tile may be customized for the function it provides for the given sensor channel.

In the first sensor channel of the array 1100, a constant 16 kHz bandwidth signal goes through a 16 kHz Continuous Time ("CT") element to generate a constant 50 Hz bandwidth signal. The constant 50 Hz bandwidth signal next goes through a 100 samples per second ("sps") DT element to generate a constant 12.5 Hz bandwidth signal. The constant 12.5 Hz bandwidth signal then goes through a 25 sps DT element to generate a constant 2.5 Hz bandwidth signal which is provided to a 5 sps DP element. In this way, the first layer of tiles may operate CT at the sensor bandwidth and output features at a 50 Hz bandwidth. The remaining layers may operate DT and shut power down in between samples while the signal state is held within the tile. In some embodiments, pooling may reduce the bandwidth (dilate) in each layer so that the data rate reduces exponentially.

In the second sensor channel of the array 1100, a 10 MHz bandwidth signal for 10 us pulses goes through a 10 MHz CT element to generate a 1 MHz bandwidth signal for 10 μs pulses (using an enable signal from a pulse generator 1110). The 10 MHz bandwidth signal for 10 μs pulses next goes through a 16 kHz CT element to generate a 500 kHz bandwidth signal for 10 μs pulses (using the same enable signal from the pulse generator 1110) which is provided to a 500 kHz CT element. In this way, each layer may operate CT for speed but be duty-cycled with the sensor bursts in the second sensor channel and bandwidths may reduce with each layer.

Figure 12:
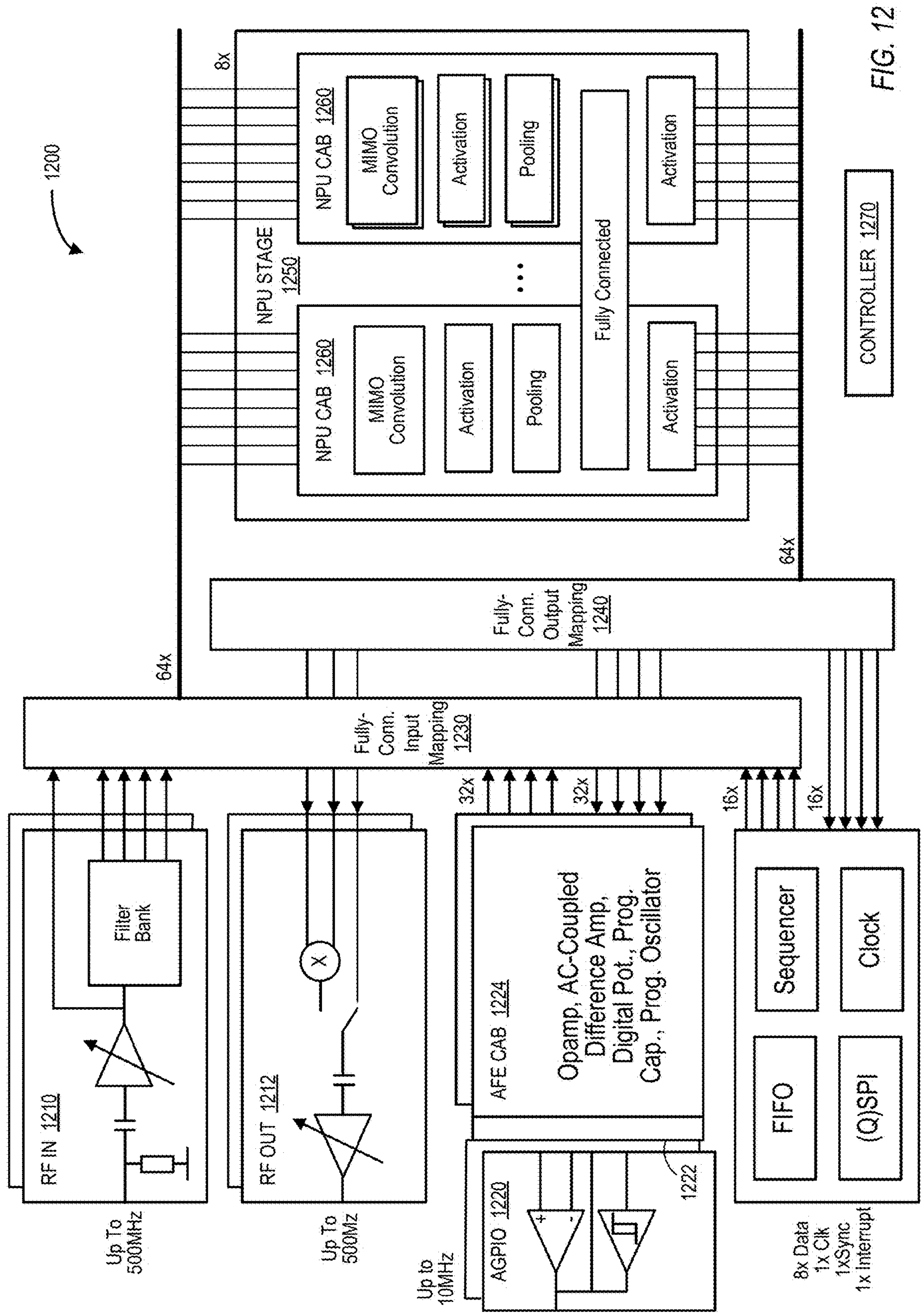
FIG. 12 is a processor block diagram according to some embodiments.

FIG. 12 is a processor 1200 block diagram targeting Radio Frequency ("RF") sensors according to some embodiments. RF input 1210 and RF output 1212 elements process radar signals of, for example, up to 500 MHz via a fully-connected input and output mappings 1220, 1240. An Analog General-Purpose Input Output ("AGPIO) 1220, a switch matrix 1222, and an Analog Front-End ("AFE") CAB 1224 may process an input signal of, for example, up to 10 MHz to implement an operational amplifier, an AC-coupled difference amplifier, a digital potentiometer, a programmable capacitor, a programmable oscillator, etc. In this way, analog-native data may enter and exit the processor 1200 via RF or via low frequency AFE. Moreover, different interfaces can be programmed into the AFE for different transducers and signal conditioning in some embodiments. Other signals (e.g., 8× data, 1× clock, 1× synchronization, 1× interrupt, etc.) may be processed via a First-In First-Out ("FIFO") element, a sequencer element, a quad SPI ("(Q) SPI") element, a clock element, etc. That is, digital-native data may enter and exit the processor 1200 via a serial interface or parallel lines.

In this way, a two-dimensional array of CABs 1260 in stages/layers (e.g., NPU stages 1250) may be wrapped with peripherals to control and get data into and/or out of a compute array. A controller 1270 (e.g., associated with 100,000 parameters) may load models and/or parameters and control timing of DT operations. The fully-connected input mapping 1230 and output mapping 1240 layers fan-out to the array or fan-in from the array.

In the general signal flow, the analog NPU stage 1250 accepts an array of Intermediate Frequency ("IF") signals from antennas, an array of <10 MHz transducer signals, and/or digitally-originating signals. The NPU stage 1250 then fuses and analyzes these signals to generate IF output signals (e.g., novel waveforms or low-probability-of-detection radar modulations), classifications, and/or transducer control signals. The processor 1200 is controlled via a quad Serial Peripheral Interface ("SPI") (such as (Q) SPI) from a host, which can also interface through GPIO and/or Low Voltage Differential Signaling ("LVDS").

The peripherals along the left side of FIG. 12 include the IF interface, which may have multiple configurable 50Ω Input-Outputs ("IOs"). The analog front-end CABs 1260 combine common analog blocks to replace the need for custom Printed Circuit Board ("PCB") circuitry to interface with transducers. The AFE CABs are programmable and reconfigurable. Several digital interfacing blocks support control and signal routing. Fully-connected MAC mapping layers 1230, 1240 mix the peripheral data into vectors for analysis by the analog NPU stage 1250. The analog NPU stage 1250 has a series of processing stages that may communicate via 64-element analog vectors. Because the vectors are processed in parallel through many layers in one shot, with local buffering of intermediate variables as opposed to a higher-level cache, the architecture is able to run near the efficiency level of the raw analog compute elements. The NPU stages 1250 are further broken down into CABs 1260 which have high internal connectivity and localized control. The CABs 1260 are further broken down into streams, with dense MAC layers linking the streams.

Processing chains are configurable in the CABs 1260 with different routing options. Parameters are programmable with 10-bit resolution (with ranges adjustable CAB-to-CAB). The architecture might be optimized, by way of example, for radar target identification and speech/acoustic classifier models. The architecture may be designed to have minimal overhead from data movement while still having the configurability to support accurately trained models (e.g., using up to 100,000 parameters).

Figure 13:
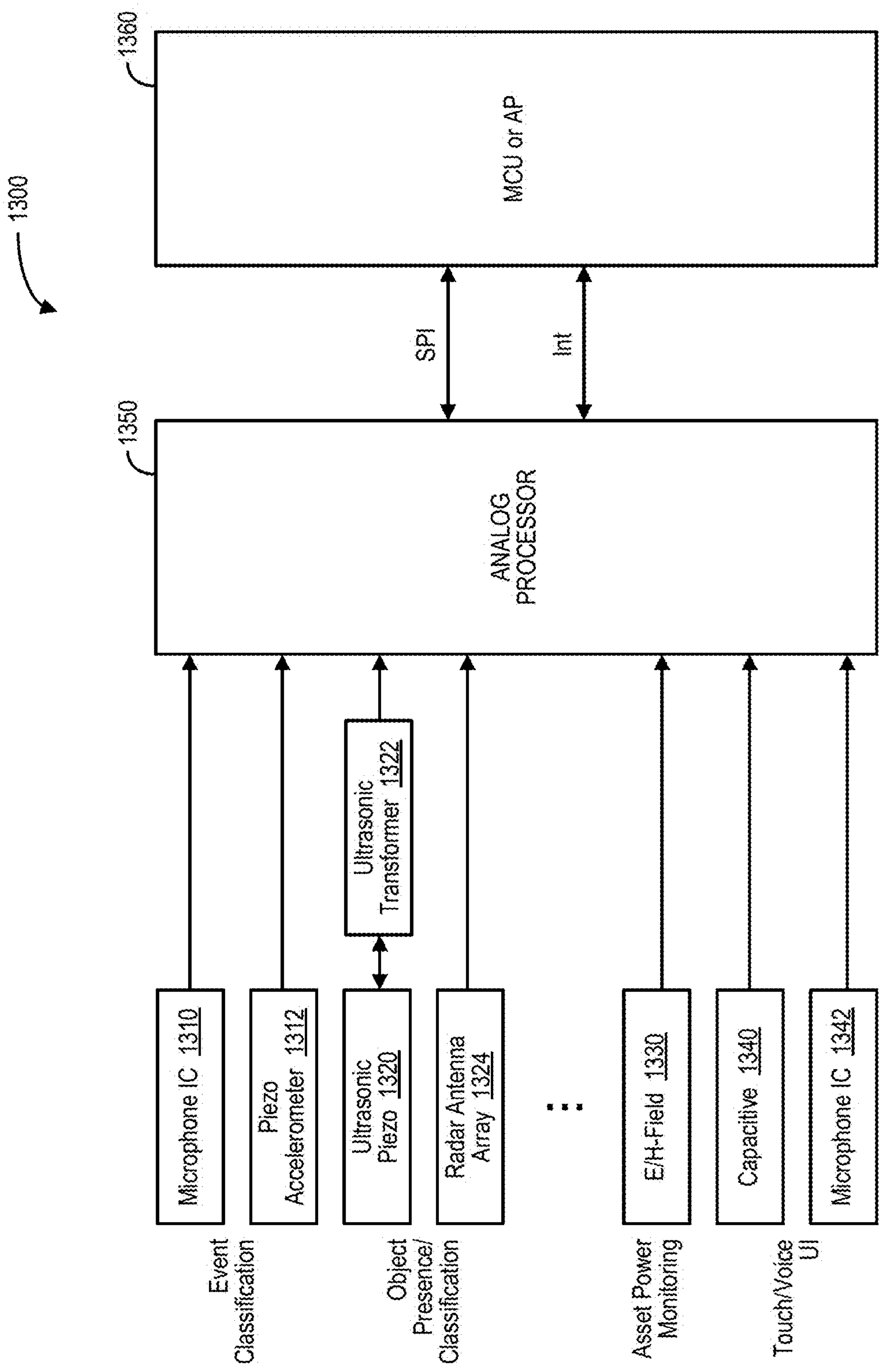
FIG. 13 is a system integration in accordance with some embodiments.

FIG. 13 is a system integration 1300 as a multimodal sensor-perception hub in a standalone Integrated Circuit ("IC") in accordance with some embodiments. A variety of sensors are taken as inputs simultaneously (which may have very different bandwidths). For example, a microphone IC 1310 and a piezo accelerometer 1312 might be used for event classification. An ultrasonic piezo 1320 (via an ultrasonic transformer 1322) and a radar antenna array 1324 might be used for object presence and/or classification. An electric and/or magnetic ("E/H") field sensor 1330 may be used for asset power management, and a capacitive sensor 1340 and another microphone IC 1342 might be used for a touch and/or voice User Interface ("UI"). An analog processor 1350 receives and processes the sensor data and exchanges information with a Microcontroller Unit ("MCU") or Application Processor ("AP") 1360 via an SPI and/or interrupts ("INT"). Note that sensors may have different interfacing/conditioning requirements programmed into the analog processor 1350, perception models may run on the sensor data, models may run independently in parallel in the analog processor 1350 (or sensor channels may be fused). In some embodiments, the analog processor 1350 interfaces with a host processor (for loading/modifying models, capturing model results, providing digital input data to the processor, etc.).

Figure 14:
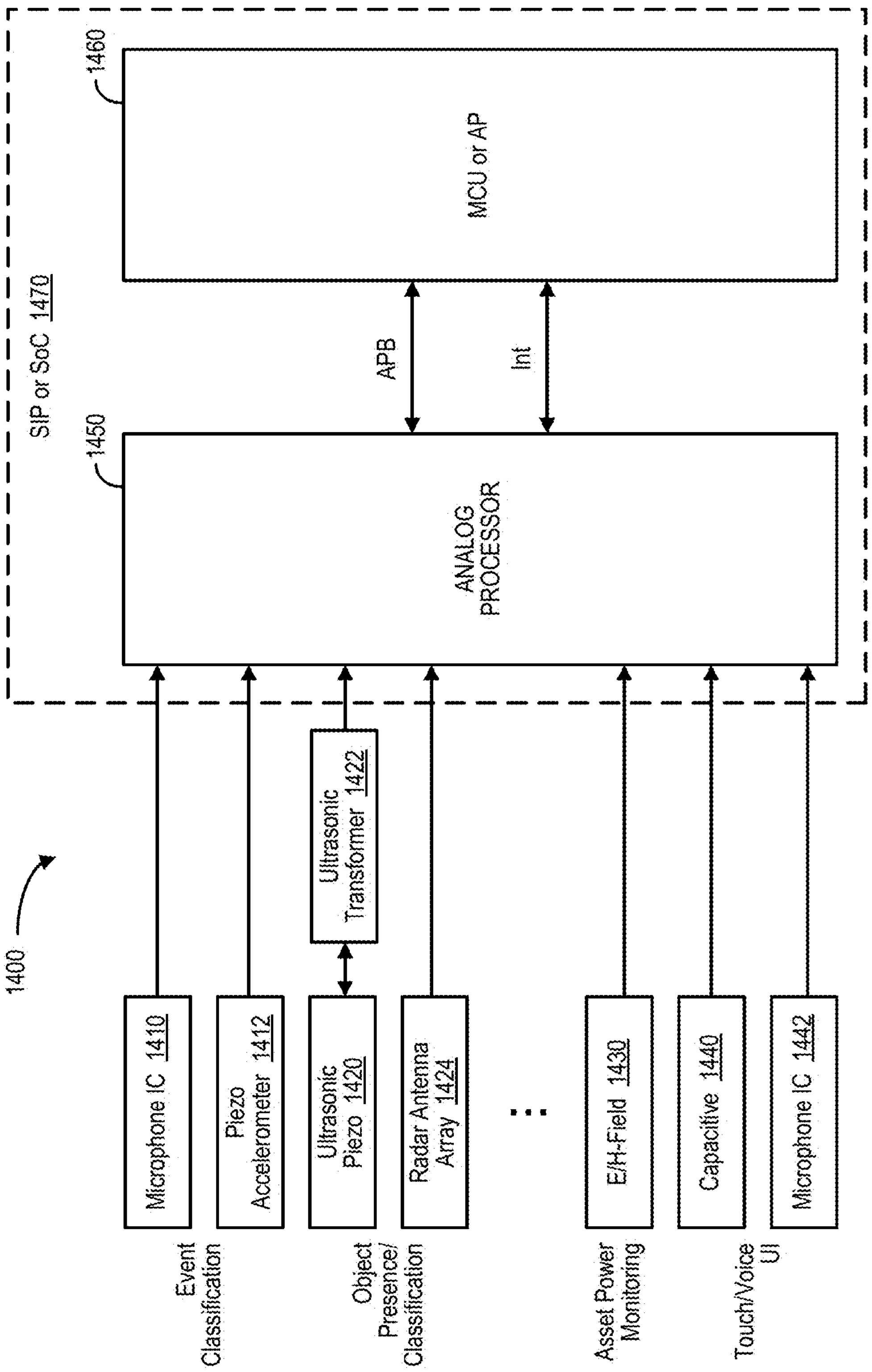
FIG. 14 is a system integration according to another embodiment.

FIG. 14 is a system integration 1400 as a peripheral integrated in a host processor according to another embodiment. As before, sensor inputs may be associated with microphone ICs 1410, 1442, a piezo accelerometer 1412, an ultrasonic piezo 1420 (via an ultrasonic transformer 1422), a radar antenna array 1424, an E/H field sensor 1430, a capacitive sensor 1440, etc. In this embodiment, a System In a Package ("SIP") or System on a Chip ("SoC") 1470 includes an analog processor 1450 that receives and processes the sensor data and exchanges information with a Microcontroller Unit ("MCU") or Application Processor ("AP") 1460 via an Advanced Peripheral Bus ("APB") and/or interrupts. The system integration 1400 may have similar characteristics as the standalone IC of FIG. 13 (though a feature set) and IOs may be shrunk for specific applications. Such an integration 1400 may achieve tighter coupling to the processor via the APB, more dynamic control (for adaptive filters, etc.), and/or more efficient digital data IO for generic ML acceleration.

Figure 15:
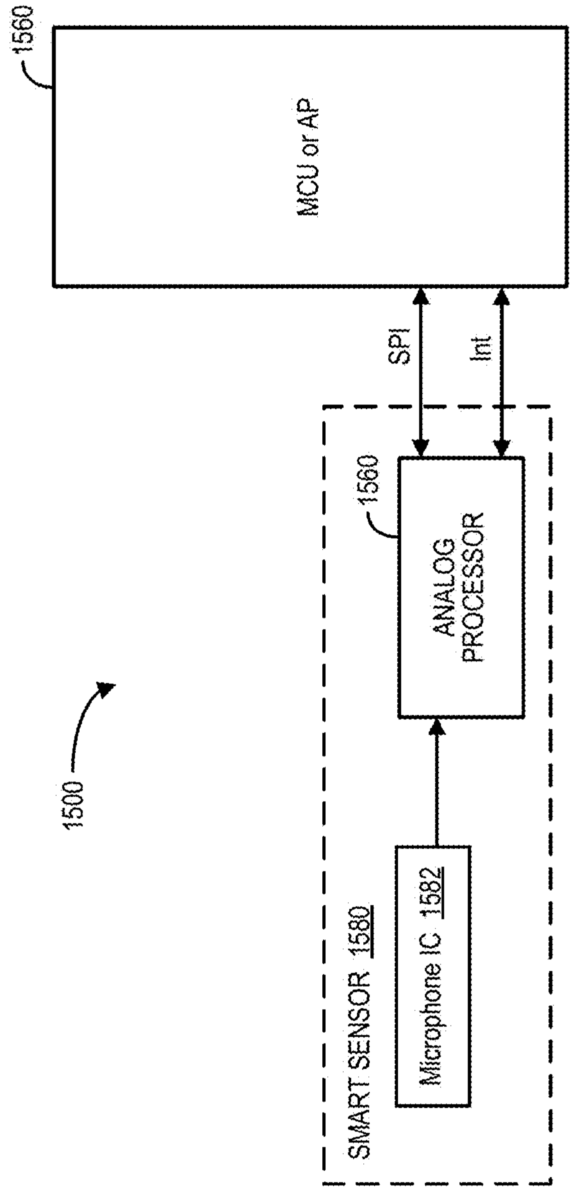
FIG. 15 is a system integration with a smart sensor in accordance with some embodiments.

FIG. 15 is a system integration 1500 with a smart sensor in accordance with some embodiments. In this embodiment, a SiP or SoC 1570 includes an analog processor 1550 that receives and processes data from a smart sensor 1580 (e.g., associated with a microphone IC 1582) and exchanges information with an MCU or AP 1560 via an APB and/or interrupts. In some embodiments, such an integration 1500 allows for a reduced feature set by using a fixed AFE block to interface with a specific transducer and/or more targeted model architectures to minimize size and/or cost.

Figure 16:
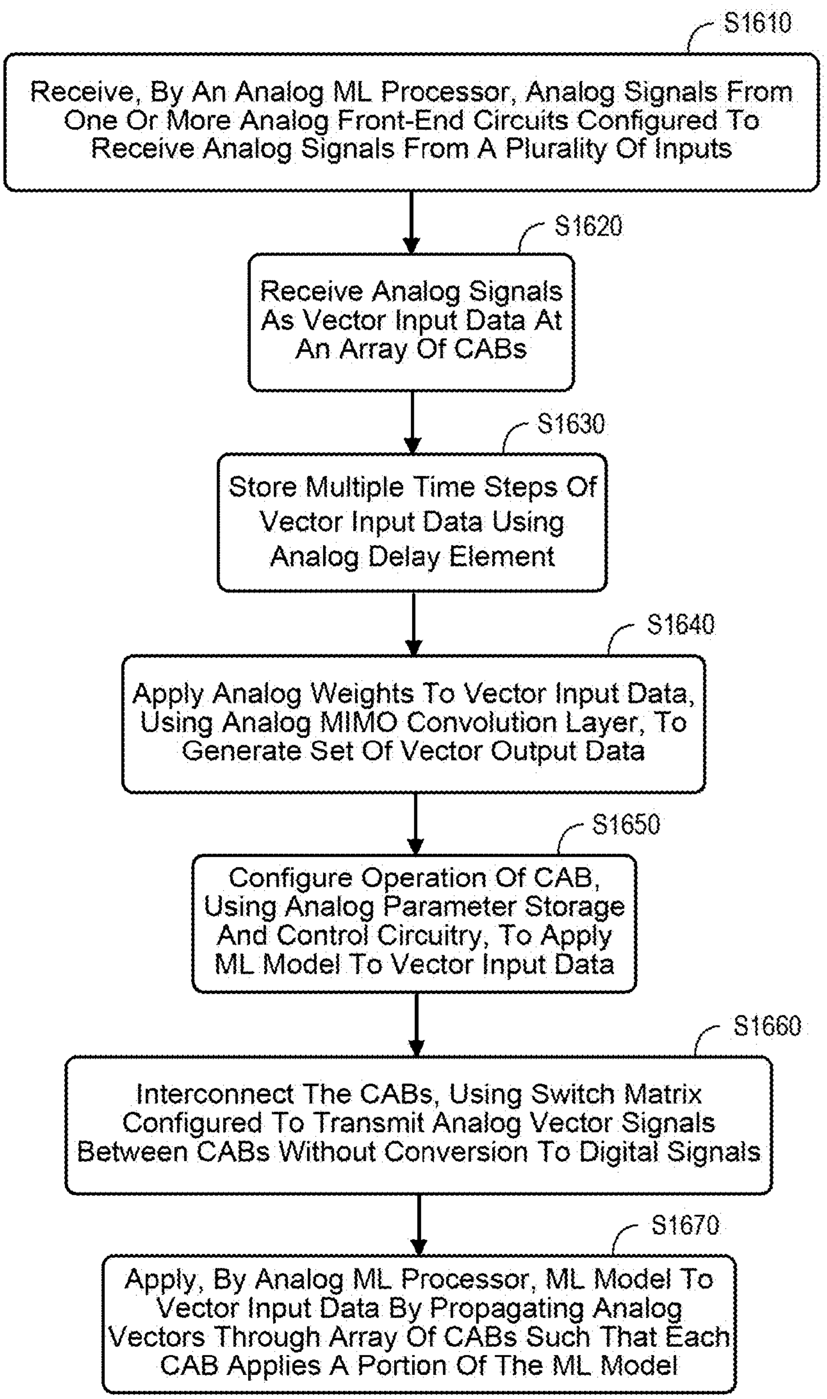
FIG. 16 is a programmable analog processor method according to some embodiments.

FIG. 16 is a programmable analog processor method that might be performed by any of the systems described herein according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in facilitation of any of the embodiments described herein.

At S1610, an analog ML processor, receives analog signals from one or more analog front-end circuits configured to receive analog signals from a plurality of inputs. At S1620, an array of CABs receives the analog signals as vector input data. An analog delay element is used to store multiple time steps of the vector input data at S1630. At S1640, an analog MIMO convolution layer applies a set of analog weights to the vector input data to generate a set of vector output data. At S1650, embodiments configure operation of the CAB, using analog parameter storage and control circuitry, to apply a data processing network (e.g., ML model) to the vector input data. At S1660, the CABs are interconnected using a switch matrix configured to transmit analog vector signals between CABs without conversion to digital signals. At S1670, the analog processor applies the data processing network to the vector input data by propagating analog vectors through the array of CABs such that each CAB applies a portion of the data processing network.

Thus, some embodiments may provide an analog processor with an AFE and a general purpose CAB signal chain that can function as either a signal processor or as part of a neural network. Moreover, the CAB may have multiple linear processing streams associated with a MIMO delay element. Each processing stream might be, for example, connected to an n-wide (e.g., 8-wide) bus. In some embodiments, each processing stream includes: a V2I element coupled to a multiply element that, in turn, is coupled to a I2V element. The I2V element may be coupled to a bias insert/offset cancel element coupled to the I2V element which, in turn, is coupled to an activation element coupled to the bias insert/offset cancel element. In some embodiments, connections between different streams in the bus may be included. For example, the output of the multiply elements may connect to multiply elements in other streams for an "accumulation."

The CAB may be associated with analog memory composed of a DAC with current outputs. For example, a current corresponding to a digital word may be controlled by local SRAM cells. In some embodiments, an autonomous inference sensing architecture includes an AFE signal processor, a neural network processor, an appropriate host interface, a calibration element, etc. Some embodiments may further include an accelerator architecture array with configurable block boundaries and contents, a flexible interface and communication between blocks, optimization for a broad range of models, an ability to compile a generic ONNX to the array, etc.

In this way, embodiments may provide an improved programmable analog processor that operates in an accurate, automatic, and efficient manner. Note that as sensor perception accuracy requirements increase, deep-learning models may be adopted at the edge, the models may get bigger, and both computation and power consumption may increase. As a result, always-on sensor perception increasingly relies on embedded digital acceleration (e.g., a NPU or DSP) which is efficiency-limited by digital logic circuits and processing nodes. Moreover, systems are efficiency limited by layers separating sensors from processing. One alternative uses analog ML acceleration with more efficient arithmetic operations and lower system requirements. The larger analog processors described herein can scale up to meet model requirements.

Moreover, as RF sensing bandwidths and antenna array sizes increase, ADC and digital processing may be cost-prohibitive to keep up. One alternative uses analog acceleration to make rapid decisions at the antenna element to adjust analog front-end parameters and inform the digital processor directly of signal content. But the analog bandwidth must scale up to meet these processing requirements. The faster analog processors described herein may help support such bandwidths.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. An analog processor, comprising:
- an array of Configurable Analog Blocks ("CABs") receiving analog vector input data, each CAB including:
  - a layer of analog delay elements storing multiple time steps of the vector input data,
  - an analog Multiple-Input Multiple-Output ("MIMO") convolution layer applying a set of analog weights to the time steps of the vector input data to generate a set of vector output data, and
  - analog parameter storage and control circuitry to configure operation of the CAB to apply a data processing network to the vector input data; and
- a switch matrix interconnecting the layers within the CABs and configured to transmit analog vector signals between CABs without conversion to digital signals,
- wherein the processor is configured to apply the data processing network to the vector input data by propagating analog vectors through the array of CABs such that each CAB applies a portion of the data processing network.

2. The analog processor of claim 1, wherein the is data processing network is a Machine Learning ("ML") model.

3. The analog processor of claim 1, further comprising:
- one or more analog front-end circuits configured to receive analog signals from a plurality of inputs.

4. The analog processor of claim 1, wherein each CAB further includes:
- one or more layers of analog activation circuits configured to implement nonlinear activation functions.

5. The analog processor of claim 1, wherein each CAB further includes:
- one or more layers of pooling circuits configured to dilate the analog vectors.

6. The analog processor of claim 1, wherein each CAB is composed of 8 element processing streams connected to an 8-wide bus.

7. The analog processor of claim 1, wherein each processing stream includes:
- a Voltage-to-Current ("V2I") element,
- a multiply element coupled to the V2I element,
- a Current-to-Voltage ("I2V") element coupled to the multiply element,
- a bias insert/offset cancel element coupled to the I2V element,
- a connection matrix to other streams to allow for accumulation, and
- an activation element coupled to the bias insert/offset cancel element.

8. The analog processor of claim 1, wherein CAB parameters are associated with a plurality of Digital to Analog Converter ("DAC") based controllable current sources.

9. The analog processor of claim 8, wherein a current, corresponding to a digital word, is controlled by a local Static Random Access Memory ("SRAM") register.

10. The analog processor of claim 1, wherein an autonomous inference sensing architecture includes:
- an Analog Front End ("AFE"),
- a neural network processor,
- a host interface, and
- a calibration element.

11. The analog processor of claim 1, further including an accelerator architecture array with:
- configurable block boundaries and contents,
- a flexible interface and communication between blocks,
- optimization for a broad range of models, and
- an ability to compile generic Open Neural Network Exchange ("ONNX") to the array.

12. The analog processor of claim 1, wherein CAB-level biasing and gating is applied for mixed data rates.

13. An analog method, comprising:
- receiving, by an analog processor, analog signals from one or more analog front-end circuits configured to receive analog signals from a plurality of inputs;

receiving the analog signals as vector input data at an array of Configurable Analog Blocks ("CABs");

storing multiple time steps of the vector input data using an analog delay element;

applying a set of analog weights to the vector input data, using an analog Multiple-Input Multiple-Output ("MIMO") convolution layer, to generate a set of vector output data;

configuring operation of the CAB, using analog parameter storage and control circuitry, to apply a data processing network to the vector input data;

interconnecting the CABs, using a switch matrix configured to transmit analog vector signals between CABs without conversion to digital signals; and applying by, the analog processor, the data processing network to the vector input data by propagating analog vectors through the array of CABs such that each CAB applies a portion of the data processing network.

14. The analog method of claim 13, further comprising:

implementing, using one or more analog activation circuits in each CAB, a nonlinear activation function.

15. The analog method of claim 13, wherein a CAB is associated with a Digital to Analog Converter ("DAC") based controllable current source and a current, corresponding to a digital word, is controlled by local Static Random Access Memory ("SRAM") cells.

* * * * *